Patented Nov. 17, 1936

2,061,126

UNITED STATES PATENT OFFICE 2,061,126

WATER-INSOLUBLE AZO DYESTUFFS AND FIBER DYED THEREWITH

Karl Zahn, Kurt Schimmelschmidt, and Heinrich Koch, Frankfort-on-the-Main-Hochst, Germany, assignors to General Aniline Works, Inc., New York, N. Y., a corporation of Delaware No Drawing. Original application February 3, 1932, Serial No. 590,782. Divided and this application January 6, 1933, Serial No. 650,584. In Germany February 7, 1931

12 Claims. (Cl. 260—46.1)

The present invention relates to new water-insoluble azo dyestuffs and to fiber dyed therewith.

This application is a division of our copending application Serial No. 590,782 filed February 3, 1932, which has matured into U. S. Patent No. 1,936,926.

We have found that azo dyestuffs of good fastness properties are obtainable by coupling a diazo-compound with a 2',3'-hydroxynaphthoyl-4-amino-diphenyl containing a bridge in the 2,2'-position of the diphenyl nucleus as, for instance, 2-aminofluorene, 2-amino-fluorenone, 2-aminocarbazole or 2-amino-diphenylene-oxide, only such components being used which do not contain groups rendering the dyestuffs soluble in water, as, for instance, a sulfonic acid or carboxylic acid group. The dyestuffs may be produced in substance, on the fiber or in the presence of any of the usual substrata which are adapted for the production of lakes.

Since derivatives of 2-aminofluorene, 2-aminofluorenone etc., hitherto, have not been used for the preparation of dyestuffs of the said kind, the fastness properties of the dyestuffs obtained could not be foreseen.

With the aid of the azo-dyestuffs obtainable according to this invention there are obtained without complicated after-treatment, dyeings of great tinctorial power.

Many of the dyestuffs have brilliant tints which are very much in demand and they are, therefore, useful in industry as pigment dyes when produced in substance and as developing dyestuffs when produced on the fiber.

The new dyestuffs are characterized by the following general formula:

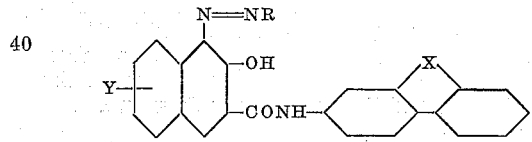

wherein R represents an aromatic radical, Y stands for hydrogen, alkoxy or halogen and X stands for a substituent of the group consisting of $CH_2$, CO, NH and O.

The following examples serve to illustrate the invention, but they are not intended to limit it thereto, the parts being by weight, unless otherwise stated:

(1) 1.5 grams of 2'.3'-hydroxynaphthoyl-2-aminofluorene are dissolved in
  1.5 cc. of alcohol,
  1.5 cc. of pyridine,
  0.75 cc. of caustic soda solution of 34° Bé. and
  2.0 cc. of water, and
  0.8 cc. of a formaldehyde solution of 30 per cent. strength is added.

The whole is allowed to stand for about half-an-hour and is then introduced into a solution of 20 cc. of Turkey red oil of 50 per cent. strength
  20 cc. of caustic soda solution of 34 Bé., made up with water to
  1 liter.

50 grams of boiled cotton yarn are treated in this bath, the grounding liquor being taken up by the material to the extent of 70 per cent. By developing the dyestuff with 1.5 grams of diazotized 4-chloro-2-nitraniline, there is obtained a vivid Bordeaux of good fastness properties.

The dyestuff has the following formula:

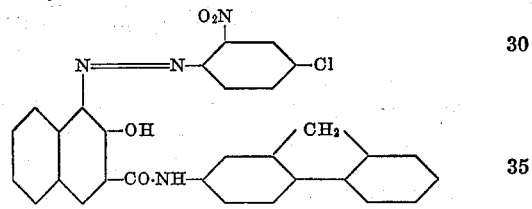

(2) Into a diazo-solution prepared in the usual manner from 16.8 parts of 4-nitro-2-aminoanisole, there is slowly run, while well stirring, a suspension of 38.6 parts of 2',3'-hydroxynaphthoyl-2-aminofluorene in a caustic soda solution to which there has been added the quantity of sodium acetate necessary for binding the excess of mineral acid. After the formation of the dyestuff is completed, the solution is filtered and the solid matter is thoroughly washed. The dyestuff may suitably be used in the form of a paste. When mixed with one of the usual substrata, a bluish red lake of good fastness properties is obtained.

(3) A paste is prepared from 2.5 grams of 2',3'-hydroxynaphthoyl-2-aminofluorenone,
3 cc. of alcohol,
4 cc. of pyridine,
4 cc. of Turkey red oil of 50 per cent. strength,
1.4 cc. of caustic soda solution of 34° Bé.,
1.2 cc. of formadlehyde and
30 cc. of hot water; the paste is dissolved in hot water;
2.5 cc. of caustic soda solution of 34° Bé. are added, and the whole is made up with water to
1 liter.

50 grams of boiled cotton yarn are treated in this bath, the grounding liquor being taken up by the material to the extent of 60 per cent. By developing the dyestuff with 1.5 grams of diazotized 4-nitro-2-aminotoluene there is obtained a vivid, yellowish-red of good fastness properties. The dyestuffs has the following formula:

By using the same grounding liquor without further addition of 2',3'-hydroxynaphthoyl-2-aminofluorenone for a second dyeing operation, there is obtained a dyeing equal to that obtainable from a freshly prepared bath containing 1 gram of 2',3'-hydroxynaphthoyl-2-aminofluorenone.

Instead of the diazo-compounds used in the examples, other diazo-, tetrazo- or diazoazo-compounds may be used.

The following table describes a number of combinations obtainable on the fiber according to the present invention:

| Diazo component | Coupling component | Tint |
| --- | --- | --- |
| 4-nitro-2-amino-anisole | 2'3'-hydroxynaphthoyl-2-aminofluorene. | Bluish red. |
| 3-nitro-4-aminoanisole | do | Bordeaux. |
| 4-chloro-2-aminoanisole | do | Bordeaux red. |
| 4-chloro-3-nitraniline | do | Bordeaux. |
| 3-nitro-4-aminotoluene | do | Bordeaux red. |
| 2,5-dichloraniline | do | Yellowish red. |
| 1-amino-4-benzoylamino-2,5-dimethoxybenzene | do | Reddish navy blue. |
| 4-amino-4'-methoxy-diphenylamine | do | Dark navy blue. |
| 4-chloro-2-aminotoluene | do | Scarlet red. |
| 1-amino-3-benzoylamino-4,6-dimethylbenzene | do | Yellowish red. |
| 1-amino-2,4-dimethylbenzene | do | Bluish red. |
| 1-amino-3-benzoylamino-4,6-dimethoxybenzene | do | Dark violet. |
| 1-amino-4-benzoylamino-2-chloro-5-methoxybenzene | do | Do. |
| 4-amino-2',3-dimethyl-azobenzene | do | Garnet. |
| 4-amino-4'-nitro-2,5-dimethoxy-azobenzene | do | Black. |
| $H_2N-\bigcirc-NH-\bigcirc-N=N-\bigcirc(OC_2H_5)(CH_3)-NH_2$ | do | Do. |
| 1-aminonaphthalene | do | Bordeaux red. |
| 2-aminonaphthalene | do | Red. |
| 4-nitro-2-aminotoluene | 2',3'-hydroxynaphthoyl-2-aminofluorenone. | Yellowish red. |
| 1-amino-4-benzoylamino-2-chloro-5-methoxybenzene | do | Currant. |
| 3-nitraniline | do | Orange. |
| 1-aminoanthraquinone | do | Bluish red. |
| 2,5-dichloraniline | do | Yellowish-scarlet. |
| 4-amino-2'-nitro-3-methoxy-2,4'-dimethylazobenzene | do | Currant. |
| 4-amino-4'-methoxy-diphenylamine | do | Navy blue. |
| 1-amino-4-benzoylamino-2,5-diethoxybenzene | do | Do. |
| 4-chloro-2-aminotoluene | do | Yellowish-red. |
| 1-aminonaphthalene | do | Bluish red. |
| 2-aminonaphthalene | do | Brownish red. |
| 1-amino-2-methyl-5-chlorobenzene | 2',3'-hydroxynaphthoyl-2-aminocarbazole. | Vivid medium red. |
| 4-amino-4'-methoxy-diphenylamine | do | Navy blue. |
| 4'-nitro-2,5-dimethoxy-4-amino-azobenzene | do | Black. |
| 1-amino-2-methyl-4-nitrobenzene | 2',3'-hydroxynaphthoyl-2-amino-diphenylene-oxide. | Bluish red. |
| 1-aminoanthraquinone | do | Do. |
| 1-amino-2-methyl-5-chlorobenzene | do | Do. |
| 1-amino-2-methyl-5-bromo-4-chlorobenzene | do | Do. |

Since an object of the present invention is to provide dyestuffs of good fastness properties, which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo dyestuffs of the following general formula:

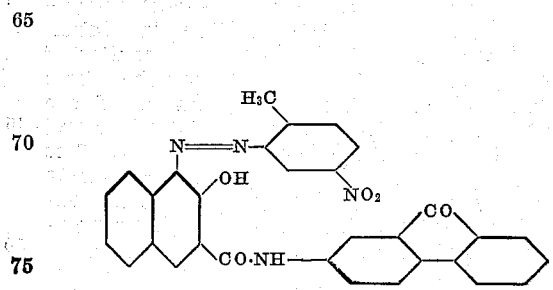

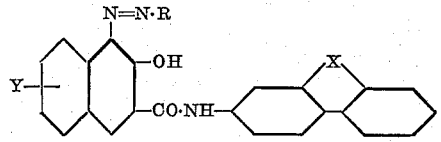

wherein R represents an aromatic radical, Y stands for one of the group consisting of hydrogen, alkoxy and halogen and X stands for a substituent of the group consisting of CH₂, CO, NH and O, yielding, when produced on the fiber, dyeings the shades of which vary from orange to red to violet to blue to black and being distinguished by great tinctorial power, partially by a good fastness to light.

2. The water-insoluble azo dyestuffs of the following general formula:

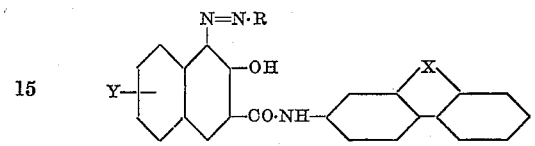

wherein R represents a radical of the benzene series, Y stands for one of the group consisting of hydrogen, alkoxy and halogen and X stands for a substituent of the group consisting of CH₂, CO, NH and O, yielding, when produced on the fiber, dyeings the shades of which vary from orange to red to violet to blue to black and being distinguished by great tinctorial power, partially by a good fastness to light.

3. The water-insoluble azo dyestuffs of the following general formula:

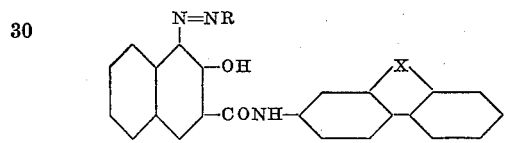

wherein R represents a radical of the benzene series and X stands for a substituent of the group consisting of CH₂, CO, NH and O, yielding, when produced on the fiber, dyeings the shades of which vary from orange to red to violet to blue to black and being distinguished by great tinctorial power.

4. The water-insoluble azo dyestuff of the following formula:

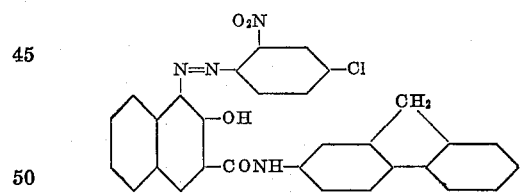

yielding, when produced on the fiber, dyeings of a vived Bordeaux shade of good fastness properties.

5. The water-insoluble azo dyestuff of the following formula:

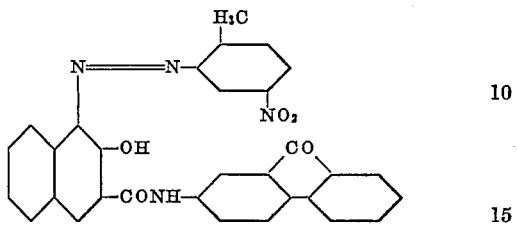

yielding, when produced on the fiber, dyeings of a vived yellowish-red shade of good fastness properties.

6. The water-insoluble azo dyestuff of the following formula:

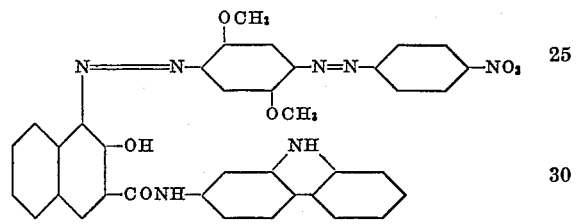

yielding, when produced on the fiber, dyeings of a black shade of good fastness properties.

7. Fiber dyed with the azo dyestuffs as claimed in claim 1.
8. Fiber dyed with the azo dyestuffs as claimed in claim 2.
9. Fiber dyed with the azo dyestuffs as claimed in claim 3.
10. Fiber dyed with the azo dyestuff as claimed in claim 4.
11. Fiber dyed with the azo dyestuff as claimed in claim 5.
12. Fiber dyed with the azo dyestuff as claimed in claim 6.

KARL ZAHN.
KURT SCHIMMELSCHMIDT.
HEINRICH KOCH.